(12) United States Patent
Yin et al.

(10) Patent No.: US 9,631,314 B2
(45) Date of Patent: Apr. 25, 2017

(54) DRUM TYPE LAUNDRY MACHINE

(75) Inventors: Fengfu Yin, Qingdao (CN); Hailong Wang, Qingdao (CN); Zhenyu Liu, Qingdao (CN); Xiaodong Zhou, Qingdao (CN); Baoliang Du, Qingdao (CN)

(73) Assignee: Xeros Limited, Rotherham (GB)

( * ) Notice: Subject to any disclaimer, the term of this patent is extended or adjusted under 35 U.S.C. 154(b) by 848 days.

(21) Appl. No.: 13/978,870

(22) PCT Filed: Aug. 12, 2011

(86) PCT No.: PCT/CN2011/078342
§ 371 (c)(1),
(2), (4) Date: Sep. 11, 2013

(87) PCT Pub. No.: WO2012/094887
PCT Pub. Date: Jul. 19, 2012

(65) Prior Publication Data
US 2013/0340487 A1 Dec. 26, 2013

(30) Foreign Application Priority Data
Jan. 11, 2011 (CN) .......................... 2011 1 0009970

(51) Int. Cl.
*D06F 39/02* (2006.01)
*D06F 39/08* (2006.01)
*D06F 35/00* (2006.01)

(52) U.S. Cl.
CPC ............ *D06F 39/026* (2013.01); *D06F 35/00* (2013.01); *D06F 35/006* (2013.01); *D06F 39/083* (2013.01); *Y02B 40/56* (2013.01)

(58) Field of Classification Search
CPC ...... D06F 39/026; D06F 39/083; D06F 35/00; D06F 35/006
See application file for complete search history.

(56) References Cited

U.S. PATENT DOCUMENTS 245,663 A * 8/1881 Rowley et al. .......... B01J 2/006
　　　　　　　　　　　　　　　　　　　　　118/418
617,405 A * 1/1899 Pett ........................ D06F 21/00
　　　　　　　　　　　　　　　　　　　　　144/208.9
(Continued)

FOREIGN PATENT DOCUMENTS

CN　　101886321 A　　11/2010
CN　　102061588 A　　5/2011
(Continued)

OTHER PUBLICATIONS

Intellectual Property Office of the P.R. China; International Search Report, International Patent Application No. PCT/CN11/078342, Nov. 17, 2011, 6 pgs.

*Primary Examiner* — Joseph L Perrin
(74) *Attorney, Agent, or Firm* — Clark & Elbing LLP

(57) ABSTRACT

Disclosed is a drum type laundry machine, including a casing, a control panel, an outer drum, an inner drum, a water inlet system, a water drainage system, a driving system, washing balls, a storage chamber disposed on the bottom of the outer drum, a circulation piping system connecting the storage chamber with the inner drum, and an outlet of the circulation pipe system leading to the inner drum and provided on an annular opening of the inner drum. The washing procedure of the laundry process described herein also includes a washing step while the washing balls circulate in the inner and outer drum, and a collecting step of the washing balls. The drum type laundry machine of the present invention can save water and electricity and can reduce pollution.

13 Claims, 2 Drawing Sheets

(56) References Cited

U.S. PATENT DOCUMENTS

| | | | |
|---|---|---|---|
| 1,760,218 A | 5/1930 | Thibault et al. | |
| 5,093,948 A * | 3/1992 | Val | D06B 11/0096 68/29 |
| 5,245,722 A * | 9/1993 | Dameron | D06F 35/00 68/29 |
| 5,511,265 A * | 4/1996 | Caputo | D06F 35/00 68/29 |
| 5,850,748 A | 12/1998 | Kim et al. | |
| 7,950,090 B2 * | 5/2011 | Tsui | D06F 39/024 68/29 |
| 8,959,961 B2 * | 2/2015 | Jenkins | D06F 23/025 68/3 R |
| 8,974,545 B2 | 3/2015 | Burkinshaw et al. | |
| 9,017,423 B2 | 4/2015 | Burkinshaw et al. | |
| 9,121,000 B2 | 9/2015 | Burkinshaw et al. | |
| 9,127,882 B2 | 9/2015 | Jenkins et al. | |
| 9,297,107 B2 | 3/2016 | Jenkins | |
| 9,315,766 B2 | 4/2016 | He et al. | |
| 9,404,210 B2 | 8/2016 | He et al. | |
| 9,410,278 B2 | 8/2016 | He et al. | |
| 9,476,155 B2 | 10/2016 | He et al. | |
| 9,487,898 B2 | 11/2016 | He et al. | |
| 9,523,169 B2 | 12/2016 | Sawford et al. | |
| 9,550,966 B2 | 1/2017 | Burkinshaw et al. | |
| 2009/0217461 A1 * | 9/2009 | Burkinshaw | C11D 3/3719 8/137 |
| 2011/0296628 A1 * | 12/2011 | Jenkins | D06F 35/00 8/137 |
| 2012/0048299 A1 | 3/2012 | Jenkins et al. | |
| 2012/0284931 A1 | 11/2012 | Jenkins et al. | |
| 2012/0304400 A1 * | 12/2012 | Jenkins | D06F 35/00 8/137 |
| 2013/0167882 A1 | 7/2013 | Burkinshaw et al. | |
| 2013/0276242 A1 | 10/2013 | Jenkins et al. | |
| 2013/0283542 A1 | 10/2013 | Jenkins et al. | |
| 2014/0123402 A1 | 5/2014 | He et al. | |
| 2014/0201929 A1 | 7/2014 | He et al. | |
| 2014/0317860 A1 | 10/2014 | He et al. | |
| 2015/0027173 A1 | 1/2015 | Wu et al. | |
| 2015/0096128 A1 | 4/2015 | Sawford et al. | |
| 2015/0096129 A1 | 4/2015 | Sawford et al. | |
| 2015/0128358 A1 | 5/2015 | Wells et al. | |
| 2015/0148278 A1 | 5/2015 | Burkinshaw et al. | |
| 2015/0152357 A1 | 6/2015 | Abercrombie et al. | |
| 2015/0175945 A1 | 6/2015 | Waddon et al. | |
| 2015/0252511 A1 | 9/2015 | Roberts et al. | |
| 2016/0032522 A1 | 2/2016 | Steele | |
| 2016/0040260 A1 | 2/2016 | Steele | |
| 2016/0122932 A1 | 5/2016 | Wells et al. | |
| 2016/0122936 A1 | 5/2016 | Wells et al. | |
| 2016/0195409 A1 | 7/2016 | Goldberg et al. | |
| 2016/0197998 A1 | 7/2016 | Carleo | |
| 2016/0251602 A1 | 9/2016 | Steele et al. | |
| 2016/0251603 A1 | 9/2016 | Steele et al. | |
| 2016/0251795 A1 | 9/2016 | Wells et al. | |

FOREIGN PATENT DOCUMENTS

| | | |
|---|---|---|
| CN | 102061589 A | 5/2011 |
| JP | 3-45296 A | 2/1991 |
| WO | WO-2010/094959 A1 | 8/2010 |
| WO | WO-2011/064581 A1 | 6/2011 |

* cited by examiner

DRUM TYPE LAUNDRY MACHINE

FIELD OF THE INVENTION

The present invention relates to a drum type laundry machine.

BACKGROUND

Nowadays, the shortage of water resource and the environment pollution are more and more serious. The laundry machine is a major water consumer, and there are much more chemical substances in the detergent that are harmful to the environment. Currently, the laundry machine needs 35 kilogram (kg) water to wash 1 kg clothes. For a washing machine with 5 kg of washing volume, 150~300 kg of water is needed to complete one wash, even it depends upon the clean degree of clothes. Moreover, the drum type laundry machine consumes more electricity, for example, the washing power of a washing machine with 5 kg washing volume is normally about 200 watts (W). One wash nearly lasts 100 minutes and consumes 1.5 kilowatts per hour (kw/h) electricity.

The process of washing is a complicated physicochemical reaction, the following effects is acted via a series of reaction: first, the binding force between the dirt and the fiber is destroyed completely, i.e. the binding force is changed from strong to weak; second, the dirt is forced to leave from the fiber, that is, the condition under which the dirt is able to exist in the fiber is lost, and the dirt is not able to exist in the fiber anymore; third, the dirt which leaves from the fiber looses the ability for binding to the fiber once again, and cannot adhere to the fiber anymore. Various conditions, such as water, temperature, mechanical force (e.g., stirring, rubbing, vibrating, etc), detergent materials (e.g., soap, washing powder, etc) need to be satisfied to complete this process and achieve above three effects. These conditions are all necessary, if only using water without detergent, or only using detergent without water, or only using mechanical force, it is impossible to clean the clothes. That because only if these conditions coordinate with each other and act different roles, the dirt will be removed from the clothes.

The practical theory of the drum type laundry machine is that the machinery rolling is used for throwing up the clothes continuously so that the clothes fall off repeatedly to simulate the beating wash way for cleaning the clothes. In order to save water and clean the clothes by using a small amount of water, a technique for saving water is invented by an university from the UK, the washing process thereof is as follows: (1) putting the clothes into the laundry machine; (2) putting the plastic fragments to the clothes through a box on the back of the laundry machine; (3) adding a cup of water and detergent materials; (4) the dirt dissolved in the water is absorbed by the plastic fragments; (5) finally, the grid at the bottom of the washing drum is opened to drop the plastic fragments down. The theory of this kind of technique is that the 20 kg weight plastic fragments are used for washing. In this case, the fragments and the clothes are rotated together, which cannot form multiple effective impacts for the clothes. In addition, a prior art of which the Chinese patent No. is ZL200920097716.2 and the subject of this utility model is the clothes washing balls for a laundry machine, the patentee is the Samsung (Tianjin) Ltd, relates to clothes washing balls used together with the clothes in the laundry machine. The surface of the clothes washing balls is injection molded with plurality of projections. During washing, the clothes washing balls are rotating together with the clothes and exist between the clothes, so that the winding between clothes is reduced and the clean degree of the clothes washed by the laundry machine is improved. However, this kind of clothes washing balls cannot effectively impact the clothes, improve the machinery force and clean degree, furthermore, the washing pattern by these balls consumes more electricity and water, and the waste water caused by this will bring out the environment pollution problem.

SUMMARY OF THE INVENTION

In order to solve the above described problem, the present invention improves a drum type laundry machine with the deficiencies existed in the prior art, polymer washing balls are used circularly in the drum. When washing, the washing balls are mixed with the clothes in the drum so as to circularly impact the clothes by using of the washing balls, meanwhile absorb the dirt by using the surface of the washing balls in order to clean the clothes.

The aim of the present invention is to improve the clothes washing effect of a drum type laundry machine.

For achieving the aim of the present invention, the present invention adopts the following technical solutions:

A drum type laundry machine includes a motor, an outer drum, an inner drum, said inner drum is provided (or disposed) in the outer drum and the central axis of the inner drum and the outer drum is disposed laterally, said inner drum is driven to rotate by the motor and a drum wall of said inner drum is provided with a plurality of through holes passing through the drum wall, wherein, further includes a plurality of washing balls and a circulation pipe line, the diameter of said washing balls is less than the diameter of at least parts of said through holes of said inner drum, one end of said circulation pipe line is connected to the inside of said outer drum via the lower side of said outer drum, the other end is connected to said inner drum, said circulation pipe line is provided with a circulation pump by which said washing balls are delivered to the inside of said inner drum so that said washing balls circulate between said inner drum and said outer drum via said circulation pipe line.

By using this drum type laundry machine, the washing balls contact with the clothes in the rotating inner drum and absorb the dirt on the clothes when the clothes are washed. After then, because the diameter of the washing balls is less than the diameter of through hole on the drum wall of the inner drum, some washing balls under the effect of gravity drop to the outer drum from the rotating inner drum via the through hole on the drum wall of the inner drum. The washing balls entering the outer drum fall upon the bottom of the outer drum (the vertical direction of the inner and outer drums is identical with vertical direction of the laundry machine). Furthermore, the washing balls in the outer drum sufficiently contact with the water so as to be cleaned. Then, under the effect of the circulation pump, the washing balls falling upon the bottom of the outer drum are delivered to the inner drum together with the water flow via the circulation pipe connected to the upper portion of the outer drum. In the inner drum, the washing balls absorb the dirt on the clothes again so as to clean the clothes. The dirt on the clothes are absorbed by using the washing balls to contact with the clothes directly so as to improve the cleaning effect of clothes, wherein, the diameter of the washing balls is less than the diameter of through hole on the inner drum wall. Furthermore, because of the arrangement of the circulation pipe and the circulation pump, the washing balls can be delivered to the inner drum to clean the clothes by turning on the circulation pump when the washing balls need to be used. The washing balls in the outer drum cannot be delivered to the inner drum by turning off the circulation pump when the washing balls need not be used.

Preferably, the lower portion of said outer drum is provided with a storage chamber for receiving said washing balls, said circulation pipe line is connected to the lower portion of said outer drum via said storage chamber.

Because the lower portion of the outer drum is provided with a storage chamber for receiving the washing balls, the washing balls can be collected sufficiently so as to be delivered to the inner drum.

Preferably, the drum type laundry machine further includes a drainage pipe connected with said storage chamber, said drainage pipe is provided with a drainage solenoid valve; a filter screen for blocking said washing balls and draining is provided between said drainage solenoid valve and said storage chamber.

Because the drainage pipe is connected with the storage chamber, the washing balls can be cleaned by using of the draining water, and the washing balls are prevented from being drained out due to the arrangement of the filter screen.

Preferably, said circulation pipe line is provided with a circulation solenoid valve which locates on a water inlet side of said circulation pump.

Because the circulation pipe line is provided with a circulation solenoid valve, the washing balls can be prevent from entering into the inner drum via the circulation pipe by turning off the solenoid valve when the washing balls need not to be delivered to the inner drum.

Preferably, the diameter of said washing balls is 2 mm~4 mm.

Preferably, said washing balls are polymer globular particles of which surfaces have at least one projection or are porous.

Because the surfaces of the washing balls have at least one projection or porous structure, the washing balls are capable of absorbing the dirt on the clothes so as to improve the clothes cleaning effect.

Preferably, said circulation pipe line is connected to the upper portion of said inner drum, said circulation pump pumps said washing balls and water flow from said circulation pipe line into said inner drum.

Because said circulation pipe line is connected to the upper portion of said inner drum, and the washing balls and the water flow are ejected to the inner drum from the circulation pipe, the washing balls together with the water flow impact the clothes so as to improve the cleaning efficiency for the clothes.

Preferably, the front of said inner drum is provided with an opening to which an opening of end portion of said circulation pipe line is disposed oppositely, so that said circulation pipe line is connected to said inner drum.

Preferably, the drum type laundry machine includes a control device for performing the following controls: tuning on the circulation pump after said inner drum rotating for a first predetermined time when the drum type laundry machine is in a state of clothes washing mode; turning off the circulation pump when the clothes washing mode is finished, after then, rotating said inner drum for a second predetermined time.

Because when the clothes washing mode is finished, said inner drum is rotating for a predetermined time after turning off the circulation pump and the circulation solenoid valve, so that all the washing balls in the inner drum are separated from the clothes and enter into the outer drum.

Preferably, the drum type laundry machine includes a control device which includes a start button for taking out the washing balls; when the start button is pressed, said control device turns on the circulation pump.

By using this kind of drum type laundry machine, a container with an opening can be put in the inner drum of the laundry when the washing balls used for a while need to be took out for manually cleaning, after then, the start button for taking out the washing balls is pressed so as to deliver the washing balls to the inner drum via the circulation pipe line by using of the circulation pump. By properly choosing the position of the container with an opening in the inner drum, the washing balls can be collected automatically.

Numerals in the figures: 1. inlet solenoid valve; 2. circulation solenoid valve; 3. drainage solenoid valve; 4. circulating pump; 5. outer drum; 6. inner drum; 7. washing balls; 8. water inlet opening; 9. large belt pulley; 10. inner drum shaft; 11. outer drum rack; 12. drainage pipe line; 13. small belt pulley; 14. electrical motor; 15. inner drum opening; 16. belt; 17 control panel; 18. circulation pipe line; 19. storage chamber; 21. detergent box; 22. casing.

DETAILED DESCRIPTION OF THE INVENTION

The drum type laundry machine according to the embodiment of the present invention will be introduced in details by referring to the above figures.

Figure 1:
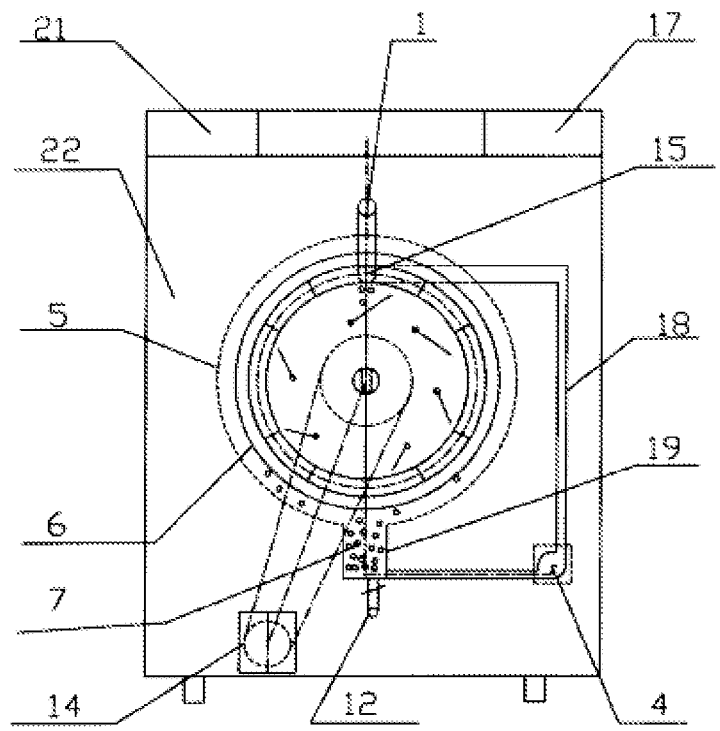
FIG. 1 is a schematic view showing the entirety of water saving drum type laundry machine according to one embodiment of the present invention.
Figure 2:
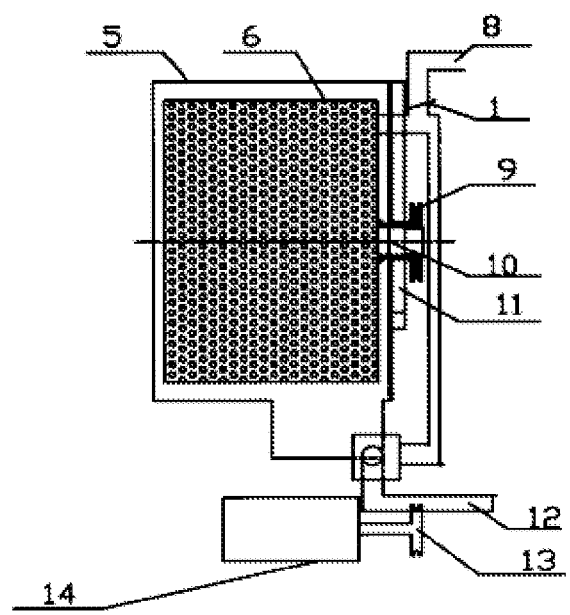
FIG. 2 is a sectional view of the water saving drum type laundry machine according to one embodiment of the present invention.
Figure 3:
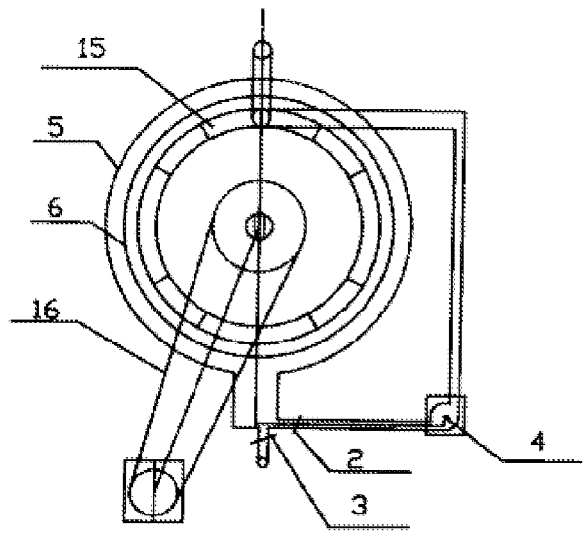
FIG. 3 is a schematic view of the circulation pipe system for the drum type laundry machine according to one embodiment of the present invention.
Figure 4:
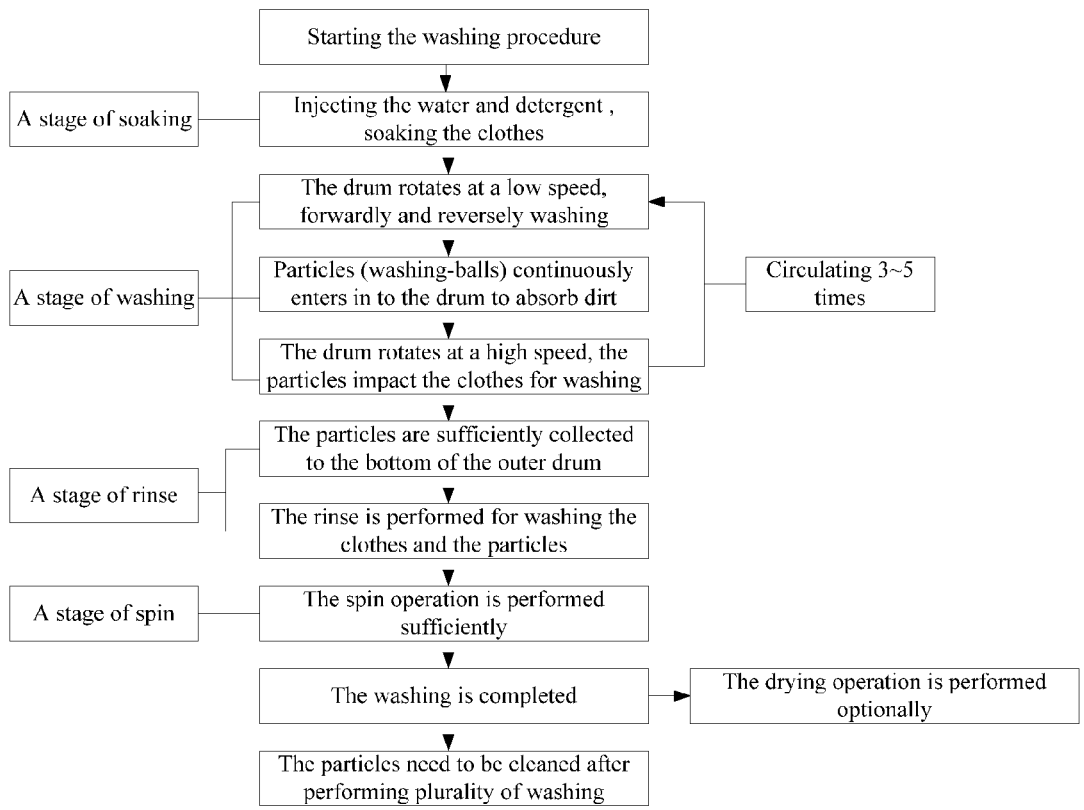
FIG. 4 is a flow chart of washing method for the drum type laundry machine according to one embodiment of the present invention.

As the FIG. 1 which is the schematic view of the structure of drum type laundry machine according to one embodiment of the present invention shown, the drum type laundry machine includes an electrical control system, a transmission structure system, a water supply and drainage system, and a circulating pump system. More specifically, as FIGS. 1 to 3 shown, the drum type laundry machine includes a casing 22, an inlet solenoid valve 1, an detergent box 21, a control panel 17, an outer drum 5, an inner drum 6, a transmission system, a drainage system and a circulation pipe line system. A storage chamber 19 (forming a receiving chamber of the embodiment) is disposed at the bottom of the outer drum. There are two outlet portions in the storage chamber 19, a downward outlet portion thereof is connected with a drainage solenoid valve 3 on which a filter screen (not shown) is provided and a drainage pipe line 12, a horizontal outlet portion of the storage chamber 19 is connected with the lower end of a circulation pipe line 18. A circulation solenoid valve 2 is mounted between the storage chamber 19 and a circulation pump 4. The upper end of the circulation pipe line 18 is connected to an annular opening 15 of the inner drum so as to let the water pumped by the circulation pump 4 and washing balls 7 enter the inner drum 6. The circulation pump 4 is an upper water draining pump applied to a normal laundry machine. The power of the upper water draining pump is 2~3 times bigger than the normal pump on account of requiring the larger pumping force and outputting the impact force simultaneously.

When the washing cycle begins, the inlet solenoid valve 1 is opened. The clean water and the detergent enter into the drum through the water inlet opening 8. Then, the circulation solenoid valve 2 and the circulation pump 4 begin to pump the washing balls from the storage chamber 19 into the inner drum 6 through the opening 15 (i.e. an opening in the front of the inner drum) in the front wall of the inner drum. The washing is alternatively performed at a washing rotation speed and a high rotation speed, for example, alternatively performed at a washing rotation speed for 5 minutes, then at a high rotation speed for 2 minutes. The washing balls 7 impact the clothes and contacts with the clothes adequately. The clothes are adjusted intermittently. Due to using small amount of water, the clothes surface is only wet, there is little water on the bottom of the outer drum. When the outer drum 5 rotates at a high speed, because the diameter of the washing balls is smaller than the diameter of parts of holes of the inner drum 6, parts of the washing balls 7 drop from the inner drum 6 to the outer drum 5 during the washing. The circulation solenoid valve 2 and the circulation pump 4 are started so as to pump the washing balls 7 dropped into the storage chamber 19 in the outer drum to the inner drum 6 through the circulation pipe line 18 again. The drum is rotated intermittently at different speeds to impact the clothes continuously so that the dirt is divorced from the clothes fiber, and the washing balls 7 can absorb the dirt from the clothes. The cycle described above iterates until the washing process is complete. After that, the inner drum 6 is performed at a high rotation speed to drain all of the washing balls 7 out of the inner drum 6. Then, only one rinse needs to be performed with small amount of water. After that the drainage solenoid valve 3 is opened to drain the waste water. The washing balls 7 is washed during the drainage due to the dirt is absorbed in the washing balls 7. After the rinse completed, the washing balls 7 are received in the bottom storage chamber 19 and washed by using of the scouring water. During the spin-dry for the clothes, the washing balls 7 can be washed continuously by using of the water from the spin. Then, the washing is completed.

The embodiment of the present invention also relates to a laundry washing method for a drum type laundry machine. The method includes washing, rinsing and spinning which are all full-automation procedures. The laundry machine includes washing balls 7, a storage chamber 19 disposed at the bottom of outer drum, a circulation pipe line system connecting the storage chamber 19 to an inner drum 6. The outlet of a circulation pipe line leading to the inner drum 6 is disposed on the opening 15 of the inner drum 6. The operating principle of embodiments and steps of the clothes washing method are as following:

I. Washing Procedure

1. A Stage of Injecting Washing Water, Detergent and Soaking the Clothes

A small amount of water and detergent are injected. The drum is rotating at a low speed 10 rotations/revolutions per minute (rpm) ~30 rpm. The clothes are soaked enough. The washing step is started: putting the clothes into the drum; closing the door; operating the control panel 17, in this case the inlet solenoid valve 1 is opened; adding a small amount of water and a certain amount of detergent through the water inlet opening 8 and an detergent box 21, and the water and the detergent enter into the inner drum 6 through the inner drum opening 15 with circular shape, meanwhile an electrical motor 14 is controlled to drive a small belt pulley 13 to rotate; the small belt pulley 13 drives a belt 16, then the belt 16 drives a large belt pulley 9, the large belt pulley 9 drives an inner drum shaft 10, the inner drum shaft 10 drives the inner drum 6 to rotate at a low speed so that the clothes are soaked enough. This stage only moistens the clothes. For 5 kg washing volume, it only needs 10~20 liter (L) of water according to the clothes types.

2. A Stage of Clothes Washing in which the Washing Balls are Circulated

First, the circulation solenoid valve 2 is opened, meanwhile the circulation pump 4 is started so that the washing balls 7 enter into the inner drum 6 through the circulation pipe line 18 from the inner drum opening 15 with circular shape. In this time, the inner drum 6 is in a rotating state with a normal washing speed. The washing balls 7 and the water accumulated in the outer drum 5 and the bottom of the storage chamber 19 are pumped by the circulation pump 4 to rush into the inner drum 6 and contact with the clothes sufficiently, so that the washing balls 7, the water and the clothes have an interaction to save the water. The particles of the washing balls interact with the clothes and the washing procedure is performed smoothly for keeping the operation balance. The circulation solenoid valve 2 and the circulation pump 4 are operating continuously to pump the washing balls 7 for 5 to 10 minutes, after then, a computer program controller controls the inner drum 6 to rotate at a high speed. In this case, the washing balls 7 interact with, impact to and absorb the clothes continuously so as to separate the dirt and the clothes, meanwhile, the washing balls 7 continuously drop to the outer drum 5 and the storage chamber 19 from the inner drum 6. The water are aggregated in the storage chamber 19 by high-speed rotation which lasts 1~2 minutes at a high speed. Two operations described above are performed alternatively. The water and the washing balls 7 at the bottom of the outer drum are continuously delivered back to the inner drum 6 again by using of the circulation solenoid valve 2 and the circulation pump 4. The above described operation is repeated 3~5 times so that the washing balls 7 sufficiently absorb the dirt and impact the clothes to separate the dirt from the clothes, and the dirt is adhered on the washing balls 7.

3. A Stage of Collecting the Washing Balls and the Clothes Washing Water

The circulation solenoid valve 2 is in an opening state during the last washing and high speed impacting. The washing balls 7 in the outer drum 5 and the storage chamber 19 enter into the circulation pump 4. The circulation pump 4 operates for a while, and the inner drum 6 rotates at a high speed at the same time so that the washing balls 7 and the waste water drop to the bottom of the outer drum sufficiently.

4. A Stage of Draining

The drainage solenoid valve 3 is opened to drain. The drainage solenoid valve 3 is provided with a filter screen which is capable of retaining the particles of the washing balls 7 in the storage chamber 19. The washing balls 7 can be cleaned by the drainage water during draining.

II. Rinse Procedure

After the washing procedure, the inlet solenoid valve 1 is opened to inject 20~40 L clean water for washing. The circulation solenoid valve 2 is closed, and the inner drum 6 rotates at a low speed to rinse for 10~20 minutes. Because the dirt is absorbed efficiently by using of the washing balls 7 in the washing procedure and the amount of detergent is mall, only one rinse needs to be completed and the necessary water volume is greatly reduced. When the rinse is completed, the drainage solenoid valve 3 is opened to drain. The rinse water can be used for cleaning the washing balls, because the rinse water is clean.

III. Spin Procedure

The spin procedure is performed after the rinse being completed. The drainage solenoid valve 3 is opened. The inner drum 6 rotates at a high speed for spinning. Because the water in the spin stage is clean and wasted in little, the washing balls 7 may be sufficiently cleaned by using this part of water. Furthermore, the laundry machine may be paused to be standby for a while so that the dirt on the washing balls 7 can be removed sufficiently. Then, the drainage solenoid valve 3 is opened to drain.

In order to keep the washing balls 7 clean, the washing balls 7 need to be cleaned after the using times of the drum type laundry machine according to the embodiment of the present invention exceeding 5~10. The specific method for washing the washing balls is: The independent program is used through the control panel, including: injecting 5 L water without putting the clothes then opening the circulation solenoid valve 2 and the circulation pump 4 to wash the washing balls 7 circularly. Furthermore, the washing balls 7 may be ejected during the drain by opening the drainage solenoid valve 3 and the filter screen thereof after turning off the solenoid valve 2 and the circulation pump 4, in order to dry or disinfect the retrieving washing balls 7.

In conclusion, the technical solution of the present invention achieves to clean the clothes with small amount of water and detergent by using a method in which the improved machinery force and the washing balls for adhering dirt are adopted, thereby saving the water and the electricity and reducing the pollution.

The present invention is not limited to the above embodiment, of course, under the essence or the range of the present invention, if the amendments and changes for the present invention made by the technical solution obvious for a person skilled in the art, is within the range of the claims of the present invention and identical replacement for the claims, the present invention covers these kinds of amendments and changes.

For example, the embodiment of the present invention can be amended as following:

In the above embodiment, the opening 15 is disposed in the front of the inner drum 6. The surface of opening for the end of the circular pipe line 18 is provided oppositely to the opening 15 so as to achieve the connection between the circular pipe line 18 and the inner drum 6. However, the present invention is not limited to this solution, for example, the bottom wall surface of the inner drum 6 may be provided with an opening 15 with an interrupted circular shape, the circle center of the opening locates on the central axis of the inner drum 6. The opening of the end of the circulation pipe line 18 is provided oppositely to the opening 15 so as to achieve the connection between the circular pipe line 18 and the inner drum 6.

In the above embodiment, the circular pipe line 18 is connected to the water inlet pipe 8 so as to use the opening 15 on the inner drum 6 to connect to the inside of the inner drum 6, but the present invention is not limited to this solution. For example, the inner drum shaft 10 of the inner drum 6 is formed as a pipe parts having a central through hole. The outlet end of the circulation pipe line 18 is pivotally connected to the inner drum shaft 10 so that a relative rotation can be achieved between the outlet end and the inner drum shaft.

Furthermore, the washing balls 7 may be made of polymer materials, and may be formed as porous or a surface with projections so as to absorb the dirt easily.

What is claimed is:

1. A drum type laundry machine comprising:
   a motor (14);
   an outer drum (5);
   an inner drum (6) disposed in the outer drum (5);
   a plurality of washing balls (7),
   a circulation pipe line (18); and
   a control device,
   wherein a central axis of the inner drum and the outer drum is disposed laterally,
   wherein said inner drum (6) is driven to rotate by the motor (14),
   wherein a drum wall of said inner drum (6) is provided with a plurality of through holes passing through the drum wall, wherein the diameter of said washing balls (7) is less than the diameter of at least parts of said through holes of said inner drum (6),
   wherein one end of said circulation pipe line (18) is connected to the inside of said outer drum (5) via the lower side of said outer drum (5), and
   wherein the other end of said circulation pipe line (18) is connected to said inner drum (6), said circulation pipe line (18) is provided with a circulation pump (4) by which said washing balls (7) are delivered to the inside of said inner drum (6) so that said washing balls (7) circulate between said inner drum (6) and said outer drum (5) via said circulation pipe line (18), and
   wherein the control device is configured to turn on the circulation pump (4) after said inner drum (6) rotates for a first predetermined time when clothes washing and is configured to turn off the circulation pump (4) when the clothes washing is finished and then to cause motor (14) to rotate said inner drum (6) for a second predetermined time.

2. The drum type laundry machine according to claim 1, wherein the lower portion of said outer drum (5) is provided with a storage chamber (19) for receiving said washing balls (7), said circulation pipe line (18) is connected to the lower portion of said outer drum (5) via said storage chamber (19).

3. The drum type laundry machine according to claim 2, further comprising a drainage pipe (12) connected with said storage chamber (19), wherein said drainage pipe (12) is provided with a drainage solenoid valve (3); a filter screen cover for blocking said washing balls (7) and draining water is provided between said drainage solenoid valve (3) and said storage chamber (19).

4. The drum type laundry machine according to claim 1, wherein said circulation pipe line (18) is provided with a circulation solenoid valve (2) located on a water inlet side of said circulation pump (4).

5. The drum type laundry machine according to claim 1, wherein the diameter of said washing balls (7) is 2 mm-4 mm.

6. The drum type laundry machine according to claim 1, wherein said washing balls (7) are polymer globular particles of which surfaces have at least one projection or are porous.

7. The drum type laundry machine according to claim 1, wherein the front of said inner drum (6) is provided with an opening (15) to which an opening of the other end of said circulation pipe line (18) is disposed oppositely, so that said circulation pipe line (18) is connected to said inner drum (6).

8. The drum type laundry machine according to claim 1, wherein the control device comprises a start button for taking out the washing balls (7); when the start button is pressed, said control device turns on the circulation pump (4).

9. The drum type laundry machine according to claim 1, wherein said circulation pipe line (18) is connected to the upper portion of said inner drum (6), said circulation pump (4) pumps said washing balls (7) and water flow from said circulation pipe line (18) into said inner drum (6).

10. The drum type laundry machine according to claim 1, wherein the upper end of said circulation pipe (18) is connected to an annular opening (15) of the inner drum (6) so as to let the water pumped by the circulation pump (4) and washing balls (7) enter the inner drum (6).

11. The drum type laundry machine according to claim 1, wherein the apparatus is adapted to clean the washing balls after performing a plurality of washing procedures.

12. The drum type laundry machine according to claim 1, wherein said circulation pipe line (18) is provided with a circulation solenoid valve (2), and the control device performs the following program: injecting water without clothes in the drum, and then opening the circulation solenoid valve (2) and the circulation pump (4) to wash the washing balls (7) circularly.

13. The drum type laundry machine according to claim 12, wherein the laundry machine further comprises a drainage pipe (12) provided with a drainage solenoid valve (3) and a filter screen cover for blocking said washing balls (7), and the control device performs the following program: ejecting the washing balls during draining by opening the drainage solenoid valve (3) and the filter screen thereof after turning off the solenoid valve (2) and the circulation pump (4), in order to dry or disinfect the washing balls (7).

* * * * *